United States Patent [19]
Koivunen

[11] Patent Number: 5,106,348
[45] Date of Patent: * Apr. 21, 1992

[54] BI-DIRECTIONAL MULTI-MODE CLUTCH FOR CHANGE-SPEED TRANSMISSION UNIT FOR AUTOMATIC CHANGE SPEED TRANSMISSIONS

[76] Inventor: Erkki A. Koivunen, 15560 Westbrook, Livonia, Mich. 48154

[*] Notice: The portion of the term of this patent subsequent to Jul. 16, 2008 has been disclaimed.

[21] Appl. No.: 697,195

[22] Filed: May 8, 1991

[51] Int. Cl.[5] .............................................. F16H 3/44
[52] U.S. Cl. .................................. 475/126; 475/146; 192/54; 192/85 AA
[58] Field of Search ....................... 475/125, 126, 146; 192/85 AA, 54, 34

[56] References Cited

U.S. PATENT DOCUMENTS

| | | | |
|---|---|---|---|
| 3,057,225 | 10/1962 | Snyder | 192/85 AA X |
| 4,261,213 | 4/1981 | Rattunde | 192/54 X |
| 4,817,772 | 4/1989 | Sacher | 192/54 X |
| 5,031,746 | 7/1991 | Koivunen | 192/54 X |

Primary Examiner—Dirk Wright
Attorney, Agent, or Firm—Charles R. White

[57] ABSTRACT

This bi-directional clutch combines the functions of two separate opposite acting clutching systems, each consisting of a one-way roller or sprag clutch and an in-series coupled multi-plate friction unit. The clutch is operative regardless of direction of torque to provide fully synchronized upshifts and downshifts of gear ratios in automatic transmissions. This clutch incorporates a torque responsive reaction plate which regulates the apply pressure in accordance to the torque carried by the clutch. Consequently, when the torque acting in selected direction descends to zero at the start of torque reversal, the clutch is automatically released. Direction of one-way action is selected by switching clutch feed and exhaust oils by controls.

7 Claims, 6 Drawing Sheets

| RANGE | GEAR | 2ND/4TH CLUTCH, BI-DIRECTIONAL MODES (280) | | | OTHER FRICTION ELEMENTS | | | | | | ONE-WAY CLUTCHES | |
|---|---|---|---|---|---|---|---|---|---|---|---|---|
| | | ONE-WAY (CCW) | ONE-WAY (CW) | RELEASE | FORWARD CLUTCH (208) | OVERRUN CLUTCH (206) | THIRD CLUTCH (210) | FIFTH BRAKE (278) | REVERSE CLUTCH (282) | REVERSE BRAKE (246) | FORWARD OWC (212) | FIRST OWC (238) |
| NEUTRAL | | | | ON | | | | | | | | |
| DRIVE | FIRST | | | ON | ON | | | | | | ON | ON |
| | SECOND | ON | | | ON | | | | | | ON | |
| | THIRD | | | ON | ON | | ON | | | | ON | |
| | FOURTH | | ON | | (ON) | | ON | | | | | |
| | FIFTH | | | ON | (ON) | | ON | ON | | | | |
| REVERSE | | | | ON | | | | | ON | ON | | |

BI-DIRECTIONAL MULTI-MODE CLUTCH FOR CHANGE-SPEED TRANSMISSION UNIT FOR AUTOMATIC CHANGE SPEED TRANSMISSIONS

FIELD OF THE INVENTION

This invention relates to automatic change speed transmissions, and more particularly, to a new and improved clutch arrangement which is effective in a plurality of differing operating modes for transmission ratio shifts, and which is operative to be automatically effective for self synchronized clutch shifts regardless of direction of torque.

BACKGROUND OF THE INVENTION

In my co-pending application, U.S. Ser. No. 501,473, filed Mar. 3, 1990, for MULTI-MODE CLUTCH FOR CHANGE-SPEED TRANSMISSIONS now U.S. Pat. No. 5,031,746 and herein incorporated by reference, an advanced clutch construction for automatic transmission is set forth which, for example, in one operating mode can be selectively activated so that the clutch provides one-way locking action to condition the transmission for a predetermined drive ratio when there is torque input in a drive direction of rotation. On torque reversal from the drive direction, the clutch automatically releases in the manner of a one-way roller clutch as another clutch in the transmission reaches capacity to carry the load. Other modes of operation were available with this clutch but automatic release occurs only on a torque reversal from a direction opposite to the automatic locking direction. While the clutch of my co-pending application, identified above, was effective in various applications, it was not suitable in certain transmission designs that required selective functions as a one-way locking device in either direction of rotation, and automatic release on torque reversals in a direction opposite to the locking direction.

SUMMARY OF THE PRESENT INVENTION

In this invention, and in contrast to the clutch of my co-pending application, one-way locking action and automatically synchronized releases are provided when the torque effecting the locking or the release of my bi-directional multi-mode clutch reverses from the direction effecting such locking or release. Accordingly, so that the bi-directional multi-mode clutching unit of this invention can be employed in a wider range of transmission designs, and particularly, in certain types of automatic transmissions having four or five forward speeds.

Since this invention finds applications as a grounding device, or for operatively connecting two rotatable members together, the term "clutch" means a breaking device or a clutching device.

In popular switch-input type four-speed automatic transmissions, the bi-directional multi-mode clutch of this invention could be used as a transmission input clutch. The clutch, set in "lock mode", is engaged or locked in the manner of a conventional multi friction plate clutch for the first gear. While the multi plate clutch carries the load in first gear, the one-way clutch component of this clutch is also engaged, and accordingly, is immediately operative to carry load. On 1-2 upshift signal, the clutch is set in "one-way mode." This mode permits a self-timed release when the load is shifted to the oncoming second clutch. At the moment of impending torque reversal, the self-regulated apply pressure drops to a near zero value and the clutch is effectively released. Shortly after the completion of the shift, the clutch is set in release mode to fully release it for the second gear operation.

The 2-3 upshift signal sets the clutch again in lock mode and at this time inlet porting from transmission controls is switched to effect reversal of one-way action. The bi-directional multi-mode clutch is applied by actuation of the apply piston as in first gear, however, the torque is now acting in opposite direction.

The 3-4 upshift signal activates the one-way mode as in 1-2 shift, only the torque is again reversed to again effect smooth, interference free upshifting.

Importantly, this construction also allows free-wheeler type downshifts. In 2-1 downshifting, the multi-mode clutch is conditioned for locking in a one-way mode and will start automatically taking over the load as the second clutch is released. The same will happen during the 4-3 downshift but with torque reversed as compared to the 2-1 downshift.

When the multi-mode clutch of this invention is used as a holding device, or "brake", it could be readily employed to hold the second and fourth gear reaction member in a five-speed automatic transmission.

It is an important feature, object and advantage of this invention to provide a new and improved clutch construction for a four speed automatic transmission having a two-way, multi-mode operation capable of locking in first gear, and permit a self timed release during a first to second gear power upshift, and further lock again in third gear where the torque is acting in a direction opposite to that of input torque for locking in first gear, permit a self timed release during a third to fourth power upshift. This invention further provides new and improved construction for automatically synchronized second to first and fourth to third gear free-wheeler type downshifts.

It is a feature, object and advantage of this invention to provide a new and improved multi-mode clutch that can function as a one-way clutch, by choice, in either direction of torque applied thereto to replace two sets of one-way clutches and their associated multiple plate clutches operatively connected in series for effecting ratio changes in an automatic transmission.

Another feature, object and advantage of this invention is to provide a new and improved friction drive establishing device, which can be employed in change speed automatic transmissions as a replacement for pairs of one-way roller clutches or sprag units combined with their associated multi plate friction packs for automatic synchronized ratio changes, and for improving the overall transmission design by significantly reducing its size and weight.

DESCRIPTION OF THE PREFERRED EMBODIMENTS

In one preferred embodiment of the present invention, the bi-directional multi-mode clutch incorporates an annular piston-like, torque sensitive reaction plate that is associated with hydraulically actuated piston movable by apply pressure fed to an apply chamber. This reaction plate carries friction plates which are interleaved with friction plates operatively connected to a planetary gear set for establishing a drive through the transmission. The torque sensitive reaction plate is moved in response to torque input by the camming action of a torque responsive wedging actuator, and against the opposing force of fluid pressure fed to the apply chamber to control the area of a fluid pressure exhaust leading from the chamber thereby controlling the apply pressure within the chamber for the piston so that the capacity of the clutch is controlled.

By providing two control ports and alternatively and appropriately connecting them with fluid supply and exhaust lines, a bi-directional multi-mode clutch can functionally replace two parallel uni-directional multi-mode clutches acting in opposite directions with significant savings in cost, size and weight of a transmission.

In addition to the two directional modes in one-way action, the subject invention also includes provisions for turning the directional modes off when not desired. This sets the multi-mode clutch in the lock mode, which is a mode where the clutch locks like a conventional transmission clutch. In the lock mode pressurized fluid is brought to act on the back side of the reaction plate to render the camming action ineffective.

The one-way mode is turned on by removing the lock mode pressure acting on the reaction plate. This is done only during the shifting to obtain a smooth and jerk-free shift feel.

With the two directional multi-mode clutch of this invention, compactness is achieved with a corresponding reduction in number or elimination of clutches, freewheelers and friction bands. This allows substantial foreshortening of overall transmission length and can therefor be used favorably in transversely mounted power packages for motor vehicles. Significant cost and weight savings can also be realized due to this compactness and simplicity.

These and other features, objects and advantages will become more apparent from the following detailed description and drawings.

DETAILED DESCRIPTION OF THE DRAWINGS

Figures 1, 1A:
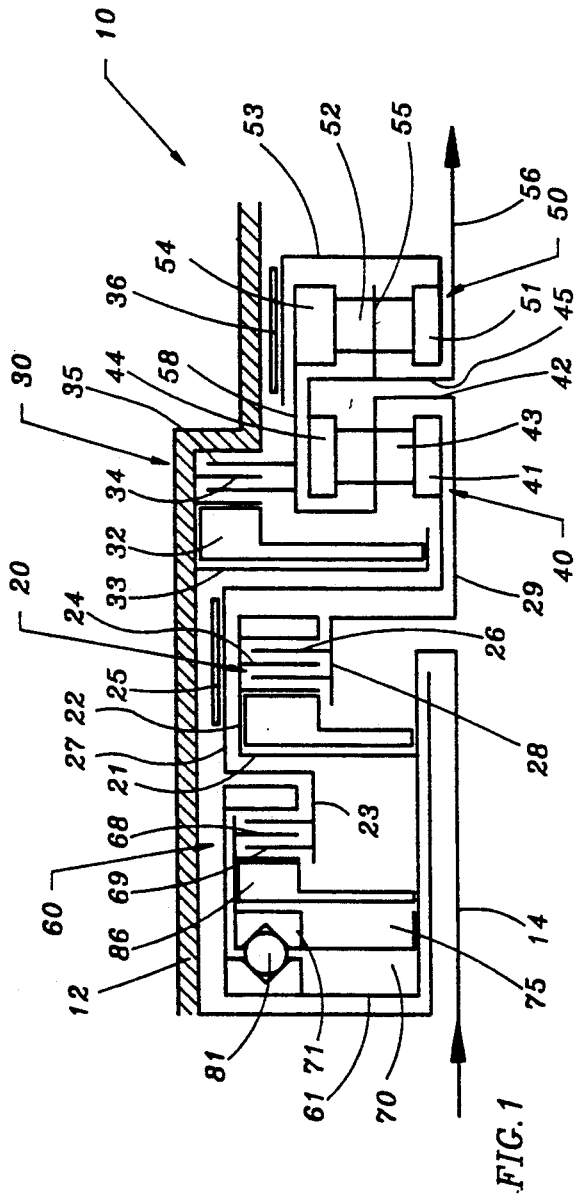
FIG. 1 is a schematic diagram of an automatic transmission for a automotive vehicle having four speeds forward and one speed reverse.
FIG. 1a is a chart keying operation or the transmission of FIG. 1 to the application and release. Accordingly, of the various clutches illustrated in FIG. 1.

Turning now in greater detail to the drawings, there is diagrammatically shown in FIG. 1 the upper half of a switch-input type four-speed automatic transmission 10 for a motor vehicle having a generally cylindrical and stepped diameter outer casing 12 and having a central input shaft 14 adapted to be driven by the output of an engine through a torque convertor or coupling, which are not shown. The input shaft 14 is drivingly connected to a rotatable input drum 61, which provides a housing for a bi-directional multi-mode clutch 60 illustrative of one preferred embodiment of this invention, and described later in greater detail, and to a rotatable cylindrical drum 21 housing a second clutch 20.

Friction plates 68 of the bi-directional multi-mode input clutch 60 are splined by tangs formed on their outside diameters to the slotted end portion 64 of the axially-extending cylindrical shell of a piston-like reaction plate 71 of the bi-directional multi-mode clutch 60. These friction plates are interleaved with annular friction plates 69, which are splined at their inner diameters to the periphery of a cylindrical hub 23 extending axially from a rotatable drum 27 that is drivingly connected with a sun gear 41 of an input gear set 40. Drum 27 is encircled by a brake band 25, which is selectively applied in fourth gear to hold the sun gear 41 from rotating. The drum 21 housing the second clutch 20, has an inner wall to which annular friction plates 24 of clutch 20 are splined by tangs formed on their outside diameters. These friction plates are interleaved with annular friction plates 26 of the second clutch, which are splined at their inner diameters to the periphery of a cylindrical hub 28 attached to an elongated drive shaft 29, that is, drivingly connected to a planetary gear carrier 42 of the input gear set 40.

Figure 4:
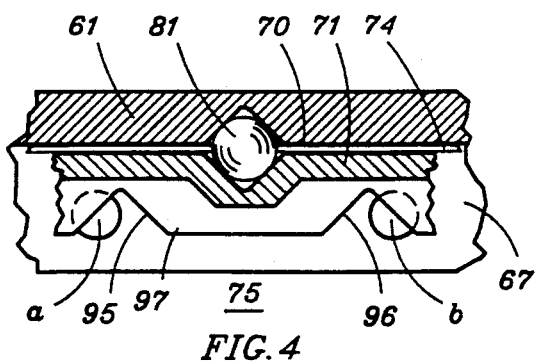
FIG. 4 is a view partially in section taken along sight lines 4—4 of FIG. 3 showing the bi-directional multi-mode clutch in the released mode.
Figure 4A:
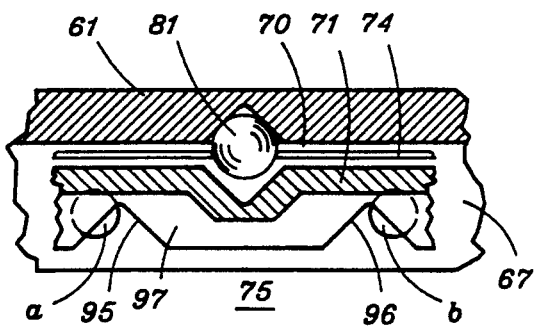
FIGS. 4a is a view similar to the view of FIG. 4 but illustrating the multi-mode clutch in a normal lock mode.

When engaged in the normal lock mode, shown in FIG. 4a, the bi-directional input clutch 60 functions as a conventional clutch to transmit engine generated torque from the input shaft 14 to the hub 23 of drum 27, which is drivingly connected to the sun gear 41 of the input planetary gear set 40. This planetary gear set has planet gears 43, mounted on the carrier 42, which mesh with a ring gear 44 and with the sun gear 41. The ring gear 44 is drivingly attached by a rotatable drum 45 to a planet gear carrier 55 of reaction planetary gear set 50 which is in turn in driving connection with a transmission output shaft 56, as shown.

A sun gear 51 of the reaction planetary gear set 50 is connected to a drum 53, which is encircled by brake band 36 that is applied in first and second gear to prevent rotation of sun gear 51. The sun gear 51 drivingly meshes with planet gears 52, mounted on carrier 55, that in turn mesh with an associated ring gear 54. The ring gear 54 is connected by a cylindrical drum 58 to the carrier 42 of the input gear set 40.

Friction plates 35 of a reverse clutch 30 are splined to the outer surface of cylindrical drum 58 and are interleaved with friction plates 34 splined to the interior of transmission housing 12. The friction plates of reverse 30 are selectively engaged in a conventional manner by a piston 32 which is slidably disposed in the bulkhead 33. When clutch 30 is engaged for reverse drive, the carrier 42 of the input gear set 40 is held and input to the sun gear is through the multi-mode clutch engaged in the normal lock mode of FIG. 4a, and the ring gear 44 is driven in a reverse direction which accordingly drives drum 45 and the connected output shaft 56 in the same direction. As shown, drum 45 is connected to the planetary carrier of the reaction planet gear set 50, but which is not active in reverse drive.

FIG. 1a is a chart identifying the various drive ranges forward showing mode operation of the bi-directional input clutch 60 in conjunction with the selective engagement of the other friction elements 36, 20, 25, and 30 to produce the four forward speed ratios, as well as reverse drive.

Figure 2:
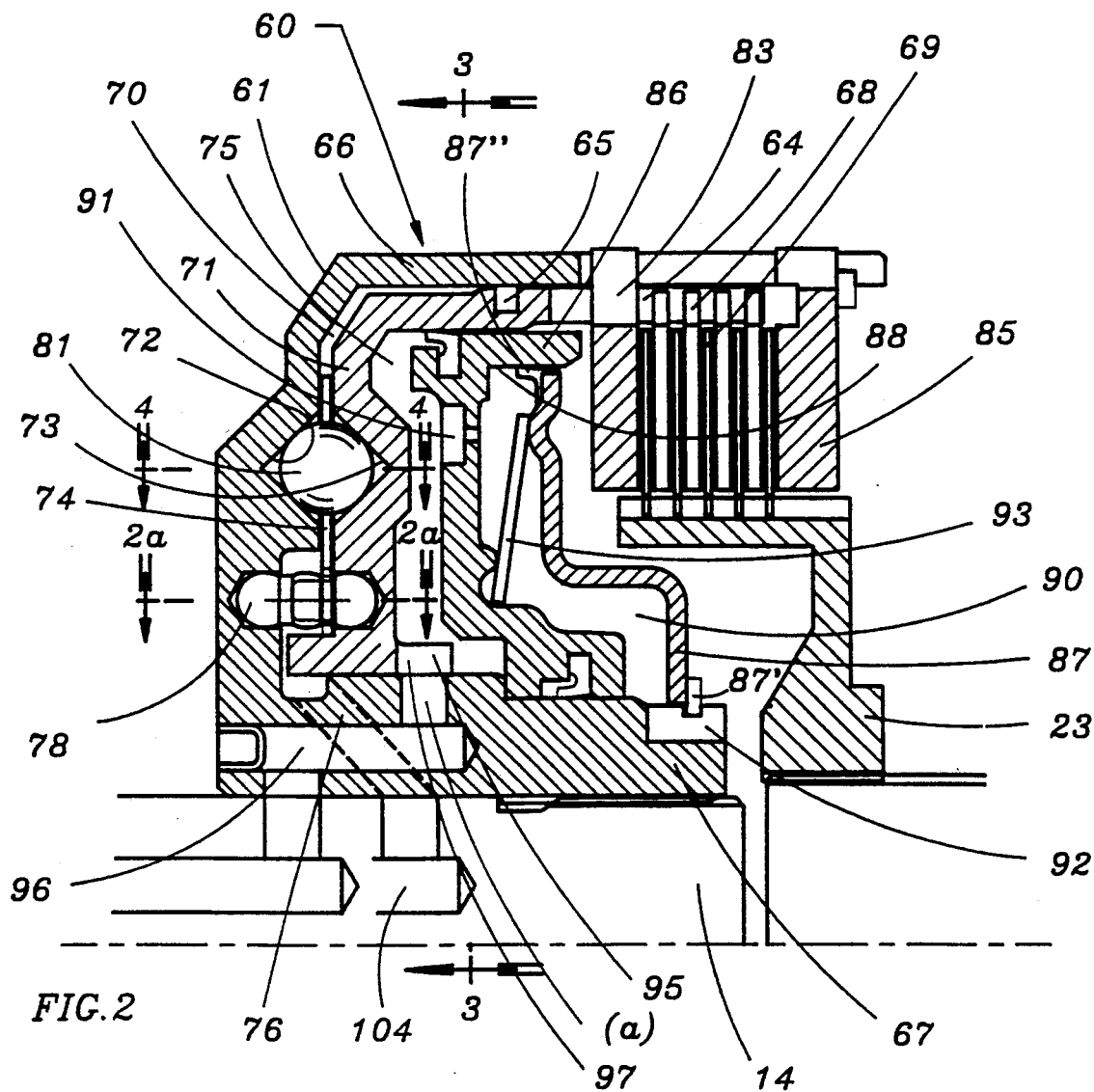
FIG. 2 is a sectional view of the upper portion of a multi-mode clutch embodying this invention, which can be utilized in the transmission of FIG. 1.

The preferred embodiment of the bi-directional multi-mode clutch 60 is illustrated in greater detail in FIG. 2. The interleaved friction plates 68 and 69 are mounted in an annular chamber operatively generally formed between a cylindrical outer wall 66 and an inner hub 67 of the input drum 61 of the bi-directional multi-mode clutch 60 splined to shaft 14. The piston-like reaction plate 71 forming a major component of the multi-mode clutch has an annular outer seal 65 that slidably engages with the inner surface of the cylindrical outer wall 66 of the input drum 61 of the bi-directional multi-mode clutch to form a pressure chamber 70. This chamber 70 has a port 76 that communicates through a line 104 with a shuttle valve 100 and a mode valve 105, shown in the controls diagram of FIG. 5.

The pressure chamber 70 formed between the drum-like housing 61 and the piston-like reaction plate 71 serves two purposes. First, the centrifugal pressure of the oil present in chamber 70 balances the centrifugal pressure acting on the opposite side of the reaction plate 71. Second, pressurization of chamber 70 results in elimination of the ball camming effect so that the multi-mode clutch locks with apply pressure supplied to chamber 75 without activation of the camming balls and ramps, described below. This mode, referred as the lock mode, is shown in FIG. 4a and is the normal operating mode of the clutch until other modes are required as will be further explained hereinafter.

A plurality of camming balls 81 are positioned within the pressure chamber 70 and are captured in retaining pockets provided by opposing conical cavities 72 and 73 respectively formed in the input drum 61 and the piston-like reaction plate 71. These balls are operatively mounted in a thin wall retainer 74 to maintain equal spacing of the balls 81, and for the purpose of eliminating the separating forces otherwise imparted on the conical surfaces by the balls due to effect of centrifugal forces.

When the reaction plate 71 rotates relative to the multi-mode input drum 61, cam balls 81 roll up the conical ramps provided by the cavities 72, and move angularly one half of the distance of the axial movement of reaction plate 71. As the balls 81 roll in contact with their ramps formed by the conical cavities during driving rotation of the drum, they maintain their relative outward position but on clutch release they always realign themselves in the bottomed position.

Figure 2A:
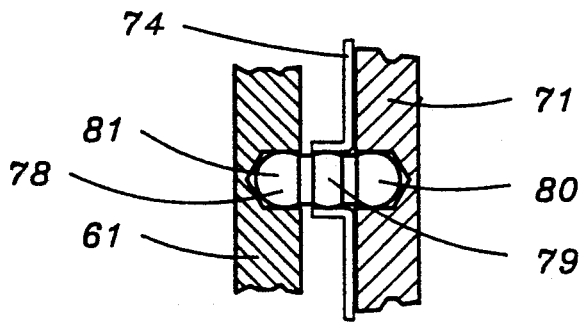
FIG. 2a is a sectional view but with some components being shown in full lines taken along sight lines 2a-2a of FIG. 2.
Figure 3:
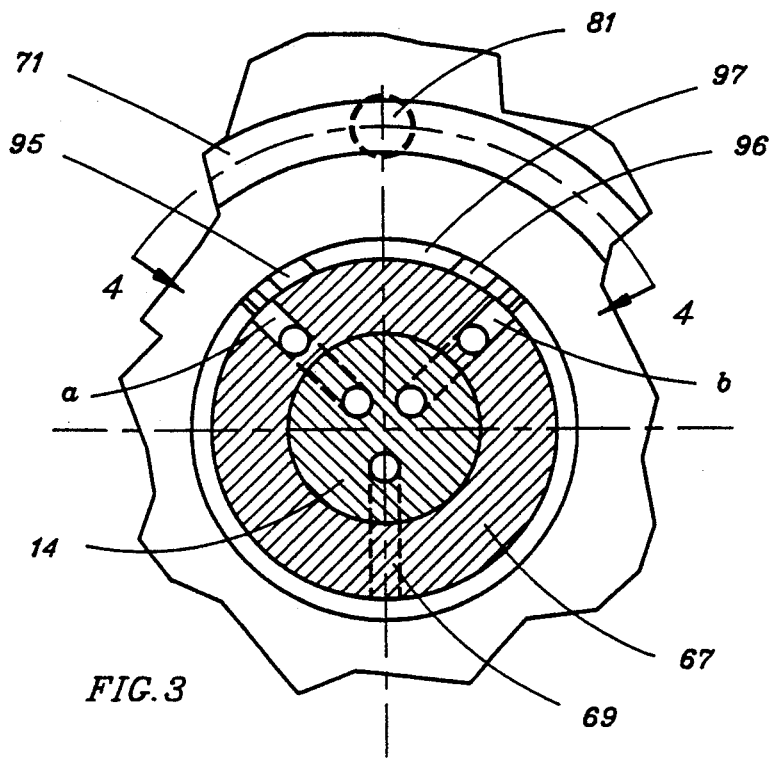
FIG. 3 is a view partially in section taken along sight lines 3—3 of FIG. 2.

In the case of ball-race separation, retainer means are provided to assure that they will not drift out of position and possibly roll off the ramp. Accordingly, the ball-race positioning system shown in FIGS. 2 and 2a eliminates this from occurring. The system comprises a lever 78 operating in axially aligned holes in the multi-mode clutch housing 61, the ball retainer 74, and the reaction plate 71. As best shown in FIG. 2a, the lever 78 has a spherical diameter 79 midway between identical spherical ends 80 and 81. When the end 80 inserted in the reaction plate 71 is displaced, the midpoint lever and the ball retainer move one half of that distance. This places the balls in the same angular position they would be if they were rolling in contact with the opposing cam surfaces.

The reaction plate 71 has an axially extending outer cylindrical wall that has arcuately spaced axial slots 64 formed therein, which receive the radially extending tangs of the friction plates 68. These friction plates are interleaved with friction plates 69, which have inner teeth that slidably fit in the splines of the cylindrical hub 23 that is drivingly connected to input sun gear 41 of the front planetary gear set 40.

The bi-directional multi-mode clutch 60 includes a front pressure plate 83 with tabs extending with rotational clearance through wide slots 64 of the reaction plate and into engagement with slots in the cylindrical outer wall 66 of the input drum 61. The clutch 60 also has an annular backing plate 85 for the clutch plate pack, formed by friction plates 68 and 69. The backing plate is splined to the outer wall of the drum and is secured by a snap ring to outer end thereof. This clutch pack is frictionally applied by application of an annular piston 86 operatively mounted on the outer diameter of cylindrical hub 67 of the multi-mode clutch housing 61 by the fluid pressurization of a chamber 75 formed between the reaction plate 71 and the piston 86.

An annular balance piston 87, mounted on another portion of the outer diameter of the hub 67 and held therein by a snap ring 87', has on its outer periphery a molded-in seal 87" which slidingly engages with an inner diameter 88 in the piston 86. The balance piston 87 and the piston 86 form a chamber 90 which is kept full of oil by bleeding through an orifice 91 in the wall portion of piston 86. Any excess oil is allowed to overflow through a notch 92 in the inner hub 67 of the multi-mode clutch housing 61. A belleville-type return spring 93 is operatively mounted within the chamber 90 to urge the piston from drive engagement with respect to the clutch pack of the multi mode clutch while the clutch is disengaged.

As illustrated in FIGS. 2, 3, 4, 4a, 4b and 4c, the hub portion 67 of the input drum or clutch housing 61 has two radial holes identified as ports (a) and (b), which through the cooperative action of the corresponding notches 95 and 96 in an inner axially extending collar 97 of the reaction plate 71 control the pressure in the piston chamber 75. These ports are switchable for flow input and flow output purposes, for example, port a in FIG. 4b, receives the feed oil while the piston chamber pressure. When the reaction plate along a spiral path determined by ball ramp angle, it moves further outward of the FIG. 4b position, for example, nearly closing the exhausting port (b) but leaving the feed port open to effect an increase in pressure. When the ports are switched on torque reversals, such as in FIG. 4c, port b becomes the feed port while port a is cracked to control the pressure in chamber 75.

In the release mode shown in FIG. 4, the reaction plate 91 is retracted and the balls 81 are in their bottomed position. Both the multi-mode clutch feed and multi-mode clutch exhaust lines are exhausted and consequently the chambers 70 and 75 are also exhausted. Under these conditions the multi-mode clutch is totally disengaged and can function as a freewheel clutch in either direction of rotation.

Figure 4B:
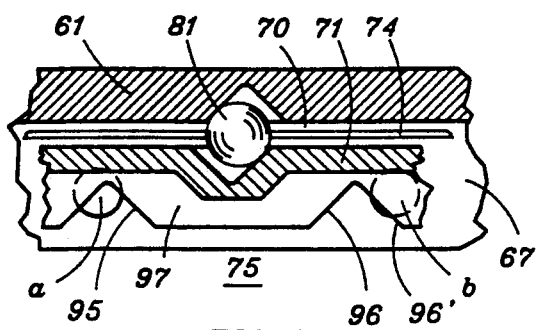
FIGS. 4b and 4c are views similar to the view of FIG. 4 but acting as a one-way device in opposite directions.
Figure 4C:
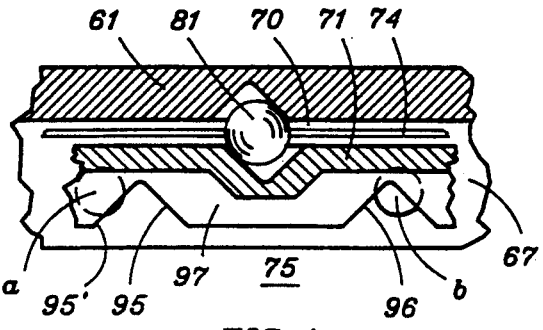

In the first gear operating position of the multi-mode clutch 60, the reaction plate 71 turns in a clockwise direction relative to the input drum 60, as shown in FIG. 4c. The multi-mode clutch feed oil, in this case, is directed to port (b) and port (a) is cracked to the multi-mode clutch exhaust line. This clockwise rotation of the reaction plate 71 progressively displaces edge 95' of the notch 95 relative to the port (a) to thereby restricts the discharge of oil from pressure chamber 75. This action adjusts the pressure acting on the piston 86 and reaction plate 71 until the opposing camming force of balls 81 and the hydraulic force acting on the reaction plate 71 are in equilibrium. Pressure regulation resultantly occurs in apply chamber 75.

During a 1-2 power upshift, as the plates of the second clutch 20 engage and begin to carry torque, the multi-mode clutch torque drops and the pressure in piston chamber 75 decreases correspondingly until it reaches a near-zero value at the torque reversal. Multi-mode clutch 60 is then returned to a released mode, shown in FIG. 4, and the transmission is in condition for second gear drive with the load shifted to the second clutch.

For the automatically synchronized second to first gear clutch downshifts, the second gear 20 releases and the torque reverses and falls on the reaction plate 71 which timely locks in the one-way FIG. 4c position for automatically synchronized downshift first gear operation.

In third gear, the multi-mode clutch 60 must hold the feed back torque from the input gear unit 40 in the opposite direction as compared to first gear operation. This torque is therefore in the relative counter-clockwise direction, as indicated in FIG. 4b. For this operation, the controls switch the pressure oils from one control port to the other. The multi-mode feed oil is now directed to the port (a) and the multi-mode clutch pressure relating exhaust from the cracked port (b). Rotating in clockwise direction, the edge 96' of notch 96 in the reaction plate 71 slides turns to restrict the port (b) thereby controlling the outflow of oil from chamber 75 and providing regulation of the pressure present therein.

The 3-4 power upshift is essentially the same as the 1-2 power upshift except that the fourth band is applied and the multi-mode clutch 60 sets in one-way mode for release; torque, is reversed as compared to 1-2 power upshift.

In a fourth to third gear automatically synchronized downshift, torque reversal to the multi-mode clutch is opposite to that in FIG. 4c for the synchronized second to first gear downshifts. In the 43 gear downshift, the bi-direction aspect of the multi-mode clutch effects the engagement of the multi-mode clutch in an automatically synchronized manner for the accurately timed downshift.

In the lock mode, FIG. 4a, both ports (a) and (b) are fed with multi-mode clutch feed oil. Some oil is also directed to chamber 70 which forces the reaction plate forward thereby eliminating the ball camming effect and self-regulation of the clutch capacity. In this mode, the clutch can be applied as a conventional clutch and calibrated for a smooth engagement by conventional hydraulic pressure regulating means. The lock mode also stops the oil flow loss through the feed orifice present in one-way mode operation.

The chamber 90, FIG. 2, formed between the piston 86 and the balance piston 87, is supplied with oil by bleeding oil through the orifice 91 from chamber 75 and allowing it overflow through the notch 92 for return to the transmission pump. This is done to balance the centrifugal effect of the oil acting on the opposite side of the piston 86 to reduce any tendency of the multi-mode clutch to apply when conditioned for the released mode.

Figure 5:
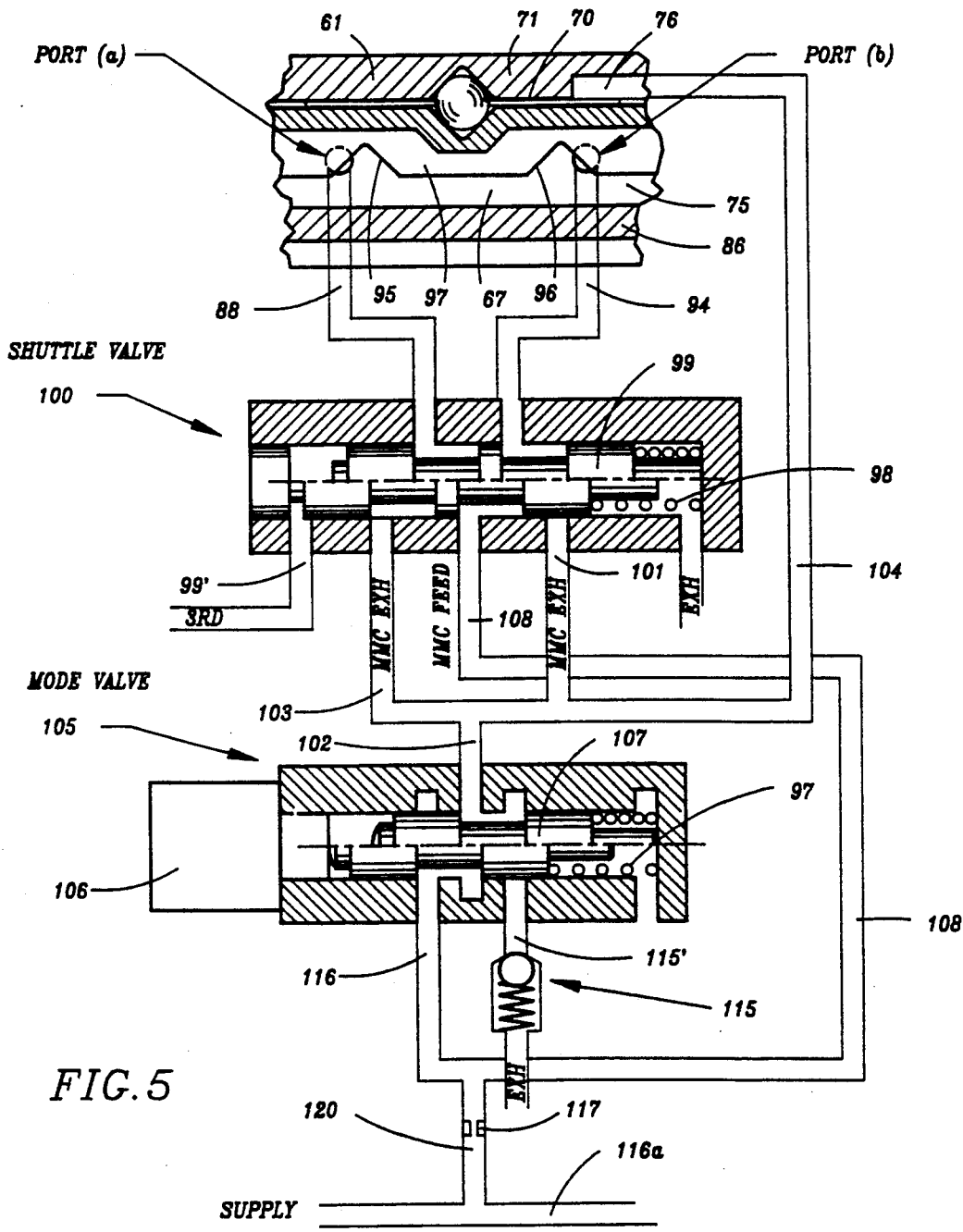
FIG. 5 is a diagrammatic view illustrating a portion of hydraulic controls for the multi-mode clutch of this invention.

One basic control system for the bi-directional multi-mode clutch, shown in FIG. 5, consists of three valves: shuttle valve 100, mode valve 105 and the ball regulator valve 115. The transmission line oil is supplied from line 116A to the mode valve 105 via passage 120 an orifice 117 and passage 116. The restriction provided by orifice 117 sets the feed rate to pressure chamber 75 whose pressure is controlled by the feed rate of the exhausting port a or b. The mode valve 105 sets the system in either the lock mode or the bi-directional one-way mode. The mode valve 105 is normally in lock mode with the valve spool shifted to the left mode but can be set in a one-way mode by energizing a solenoid 106. When the solenoid 106 is energized, the valve spool will be shifted against the opposing force of spring 97, as will be explained hereinafter.

In the lock mode the valve spool 107, biased by spring 97, is in the leftward position. In this position, the mode valve feeds pressure oil from line 116 to a passage or line 102 that connects by line 103 to the shuttle valve 100. Line 101 is also pressurized. Pressure oil in line 102 also feeds into to the passage 104 leading to the pressure chamber 70 on the back side of the reaction plate 71. In the absence of torque reversal to the bi-directional multi-mode clutch, charging chamber 70 with pressure negates any one-way camming effect of the balls 81 in their conical cavities, and sets the clutch in the lock mode of FIG. 4a.

When the solenoid 106 is energized, pressure oil is supplied through a port, not shown, to the left hand end of valve spool 107 which is forced to the right against the force of spring 97, as illustrated and the bi-directional one-way mode is initiated. In this bi-directional one-way mode, the multi-mode clutch exhaust oil is directed by the shifted valve spool 107 to the ball regulating valve 115 via line 115'. The regulating valve 115 is spring biased to maintain a 3-5 psi minimum pressure in the multi-mode clutch exhaust passages 101 or 103 and thereby a tickling pressure is maintained in pressure chamber 75.

The shuttle valve 100 is a four-way valve which on command switches the feed and exhaust connections to the control ports a and b. In the first gear mode, the spring 98 moves the spool valve 99 to the left. Line 94 connecting to port (b) is opened to the multi-mode clutch feed line 108 and the line 88 connects to port (a) to the multi-mode clutch exhaust via line 103. This line connects to the regulator valve 115 since the valve spool 107 of the mode valve is in the bi-directional one-way position.

When the transmission is shifted to the third gear, the third gear passage 99' becomes pressurized with oil from a shifter valve, not shown, and the spool valve 99 moves to the right. In the third gear, port (a) is connected to the multi-mode clutch feed 108 and port (b) to the multi-mode clutch exhaust via line 103, and the mode valve spool shifted to its bi-directional one-way mode.

With the above described control system, and as shown in chart FIG. 1a, the bi-directional multi-mode clutch transmission is in the normal lock mode for first and third gear drives. The clutch operates in the bi-directional one-way mode only for ratio changing, and is returned back to the normal lock mode after the shift is completed.

With a conventional manual valve, not shown, displaced by the vehicle operator to a neutral position, the supply line 116a leading to the mode valve 105 is exhausted at a conventional 1–2 shift valve, not shown. The valve spool 107 of mode valve 105, with solenoid 106 de-energized, is shifted to the lock mode. The multi-mode clutch feed, passage 102 is connected with the exhausted multi-mode clutch feed passage 108. The position of the valve spool 94 of shuttle valve 100 position is unimportant at this time. The four-speed transmission shown in FIG. 1 may have the band 36 applied, but all other friction elements are released.

Shifting the manual valve to a drive range pressurizes the line 120, which has the orifice 117 therein that connects to the lines 116 and 108 leading to the mode valve 105 and shuttle valve 100. The spool of the mode valve 105 in a lock, or leftward, position directs the multi-mode clutch feed oil from lines 120 and 116 to line 102 and the multi-mode clutch exhaust line 104 leading to reaction plate chamber 70, as well as to the lines 101 and 103 leading to the shuttle valve 100. The shuttle valve 100 positioned in the first gear mode is displaced by spring 98 to the left to connect the multi-mode exhaust passage 103 to line 88 leading to port (a), and the multi-mode clutch feed passage 108 connects to line 94 leading to port (b). Under these conditions, the oil from the supply line 116a passes through orifice 117 and flows unrestricted through the valving system to both ports a and b and also to the reaction plate chamber 70, pressurizing both clutch chambers 70 and 75 to obtain the normal locking mode of FIG. 4a.

In the locking mode of FIG. 4a, the multi-mode clutch acts like an orifice fed clutch. A conventional accumulator, not shown, is to used cushion the clutch apply, as is well known in current automatic transmission practice.

Energizing the solenoid 106 conditions the mode valve 105 in the one-way mode by moving the spool 107 to the right, which disconnects the multi-mode clutch exhaust line 104 from the multi-mode clutch feed line 108 and joins it with the passage 115 leading to the ball regulator valve 115 for introducing a 3–5 psi tickling pressure in the multi-mode exhaust line. The shuttle valve 100 remaining in the first gear mode the multi-mode clutch exhaust line 103 to port (a), as previously described. With valves in the described positions and the reaction clutch chamber 70 exhausted, the multi-mode clutch is in the one-way mode for the following shift events.

The pressure regulation in chamber 75 provides a self-generating feature to maintain the pressure therein to a pressure just above what is needed to hold the clutch. When the torque in the multi-mode clutch drops to zero and reverses, the reaction plate 62 starts to turn faster than the clutch housing 61 and the balls automatically roll down their conical ramps in the manner of a self-releasing roller clutch as the reaction plate retracts by the force of fluid pressure in chamber 75. This action opens the exhaust port (a) to its fullest. Pressure in chamber 75, which has been dropping with the clutch torque with port (a) opened to its maximum extent, falls to zero so that the multi-mode clutch is fully released (FIG. 4). This Low capacity of the multi-mode clutch at the point of torque reversal assures that the shift will be automatic and completely smooth and free of noticeable interference. The multi-mode clutch then stays released during the second gear operation of the transmission.

On energizing of the solenoid 106, the mode valve 105 is shifted to set the multi-mode clutch in the lock mode. The events during a 2–3 upshift with the multi-mode clutch in lock mode are similar to those in many conventional automatic transmissions.

The shift events during a 3–4 upshift are basically the same as during 1–2 shift. Control ports (a) and (b) function as switches, and the automatic clutch release is in the opposite direction. In fourth gear, the on-coming friction element is the fourth band 25 and the other applied friction element is the second clutch 20.

Figures 6, 6A:
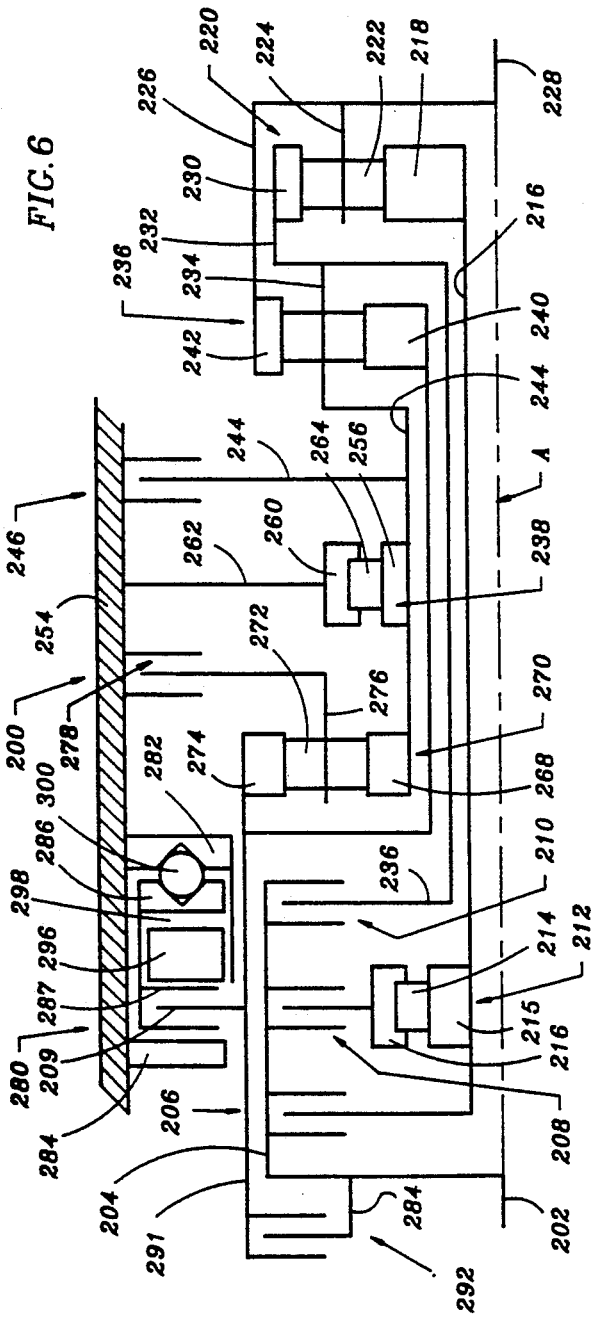
FIG. 6 is a schematic diagram of an automatic transmission for an automotive vehicle having five speeds forward and one speed reverse employing one preferred embodiment of the bi-directional multi-mode clutch of this invention.
FIG. 6a chart keying the operation of the transmission of FIG. 6 to the application and release of the various clutches illustrated therein to obtain the five forward speeds and reverse.

As pointed out, the bi-directional multi-mode clutch of this invention can be employed as a holding or grounding device for controlling the change speed gearing in other transmission design. FIG. 6, for example, illustrates a five forward speed automatic transmission 200 with one speed reverse, with the bi-directional multi-mode clutch of this invention used in establishing second and fourth forward drive ranges and to further provide freewheel type automatic upshifts and locked in these ranges is set for the bi-directional mode operation only during shifting events. The action of the bi-directional one-way mode provides automatic self timed release and apply during shifting.

In FIG. 6, the upper half of the transmission 200 is diagrammatically shown with an input shaft 202 that is drivingly connected to an input drum 204. This drum houses a multi-plate coast clutch 206 engageable for engine braking, a multi-plate forward clutch 208, and multi-plate third range clutch 210. The driven plates of the forward clutch 208 are drivingly connected to the outer race 210 of a forward one-way clutch 212 having rollers 214 providing one-way drive to an inner race 215 drivingly connected to an intermediate shaft 216 that is concentric with the longitudinal axis A of the transmission into driving connection with the sun gear 218 of a reaction planetary gear set 220. The planetary gear set 220 has planet gears 222 operatively mounted on carrier 224 that is drivingly connected to a rear drum 226 which is secured at its center to an output shaft 228 of the transmission.

As illustrated in FIG. 6, the ring gear 230 of this planetary gear 230 is fixed to an interior drum 232 that is connected at its center to a tubular drive shaft 234 that extends longitudinally and concentrically around the intermediate drive shaft 216 and axis A and terminates in a hub 236 that carries friction plates, which are interleaved with and form part of the third range multi-plate clutch 210 housed in the input drum.

The interior drum 232 of the rear planetary gear set 218 is connected to a planetary gear carrier 234 of an input planetary gear set 236. The planet gears 238, rotatably supported on this carrier 234, mesh with a sun gear 240 and a ring gear 242. The ring gear 242 is connected to the rear or output drum 226 that is drivingly connected to the output shaft 228 of the transmission.

The carrier 234 of the planetary gear set 236 is operatively connected to the interior drum 232, as well as to a center shaft 241 that also surrounds the intermediate shaft 216 and transmission axis A. This shaft has an annular support disc 244 that has a peripheral support for internally splined friction plates that are interleaved with the friction plates of a multi-plate reverse friction unit, or brake 246 splined to the interior of the transmission housing 254.

This center shaft 241 also connects to the inner race 256 of a low range one-way clutch 258 that has its outer race 260 connected by a partition 262 to the housing 254 of the transmission. Rollers 264 operatively connect the inner and outer races, operate to lock the shaft 241 in one direction of rotation and allow it to freely overrun in an opposite direction.

The center shaft 241 also is connected at its inboard end to a sun gear 268 of a first planetary gear set 270 that meshes with planet gears 272 which in turn mesh with ring gear 274. A planetary carrier 276, for these planet gears, is connected to friction plates interleaved with the friction plates of a fifth range multi-plate friction device 278 that are alternately splined to the interior of housing 234 of the transmission.

The multi-mode clutch, identified by reference 280, has an annular clutch housing and an annular backing plate 282 rigidly secured to the interior of transmission housing 254. Operatively mounted inside the clutch housing 282 is a piston like reaction plate 86. Reaction plate 286 has a forwardly extending cylinder with annular friction plates 287 splined therein, interleaved with friction plates 209 splined externally on a forward drum 291 that connects to the ring gear 274 of the planetary gear set 270. The forward outer end of drum 291 carries friction plates of the selectively engagable multi-plate reverse drive clutch 292, which are alternatively interleaved with cooperating friction plates mounted on a collar 294 of the input drum 204, as illustrated in the drawings.

The bi-directional multi-mode clutch 280 is substantially the same as the bi-directional multi-mode clutch of FIG. 2, and has a hydraulically actuated piston 296 mounted within the confines of the reaction plate 286 and forms a pressure chamber 298 therein. On torque reversals, when the friction plates 287 of the reaction plate begin to transmit torque to the reaction plate 286, the actuator balls 300 mounted in the interfacing conical cavities 320, 322 FIG. 7 of the housing and the reaction plate cause the reaction plate to turn and move forwardly in the transmission causing multi-mode clutch to regulate the pressure in chamber 314 so that the capacity of the multi plate friction unit, including friction plates 287, 209, is regulated to provide the braking capacity required to condition the gearing for second range drives. On reversal of torque during the upshifts from second to third gear and from fourth to fifth gear, the multi-mode clutch automatically moves to the release mode, such as shown in FIG. 4.

In the transmission of FIG. 6, there is synchronized downshifting with the bi-directional multi-mode clutch from fifth to fourth gear and from third gear to second gear. However, torque reversals to the reaction plate 286 are in the opposite direction for these downshifts. More particularly, for 3-2 or 5-4 downshifts, there are torque reversal but which are in opposite directions from one another and the multi-mode clutch resultantly engages automatically in the self synchronized manner of a one-way device and moves into a locking mode, such as shown in FIGS. 4b and 4c, respectively.

FIG. 6a indicates the application and release of the various identified friction drive establishing devices 280, 208, 206, 210, 228, 292, 246, 212 and 258 for the five speed forward, one speed reverse operation of the FIG. 6 transmission.

Figure 7:
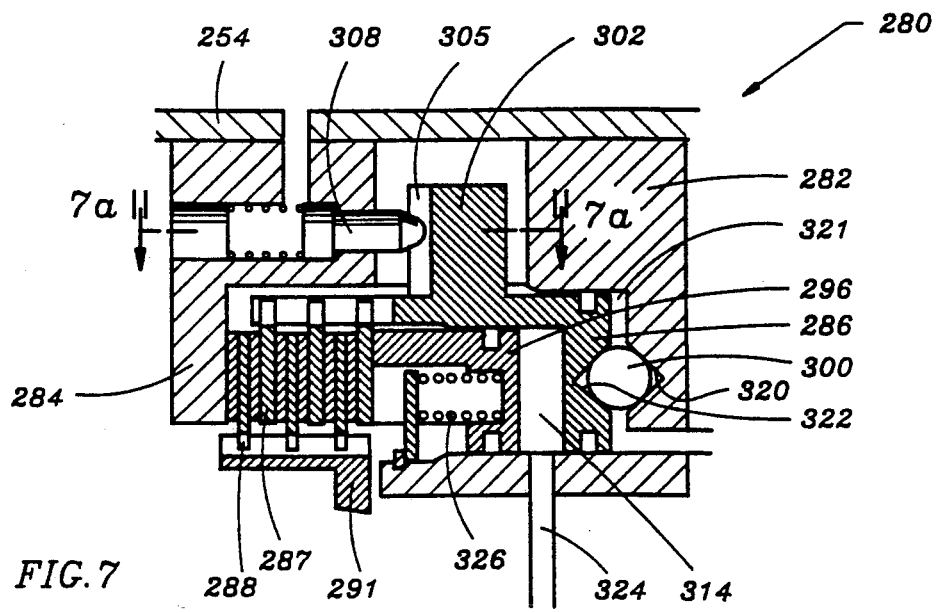
FIG. 7 is a sectional view of a portion of the multi-mode clutch of FIG. 6.

One specific construction of the bi-directional multi-mode clutch or friction drive establishing device 280 of FIG. 6 is shown in greater detail in FIG. 7. The piston like reaction plate 286 is shown as having an enlarged radial camming lug 302 thereon, which has an axially facing cam lobe with cam surfaces 305 and 306 on opposite sides thereof. The cam surfaces are adapted to be operatively engaged by valve elements 308 and 310 which are mounted in bores 312 and 313 in the backing plate 284 secured internally of transmission housing 254. These valve elements and are biased by springs 316 and 318 secured in the leaves.

Figure 7A:
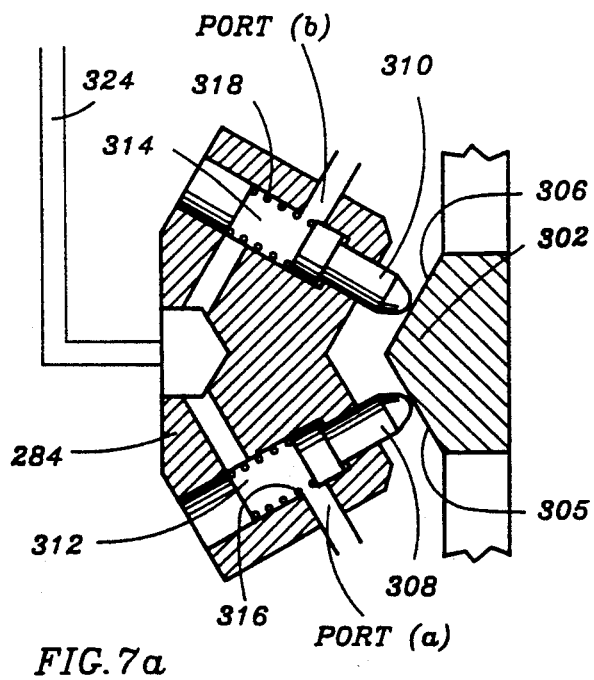
FIG. 7a is a sectional view taken generally along sight lines 7a–7a of FIG. 7.
Figure 7B:
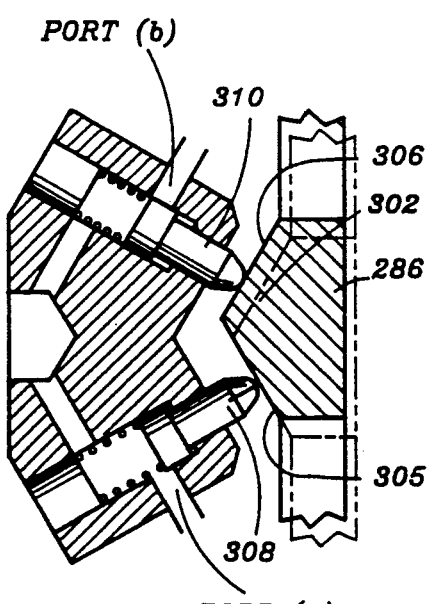
FIG. 7b is a sectional view similar to the view of FIG. 7a but showing components in a moved position.

As best shown in FIG. 7a, the headed ends of the valve elements 308 and 310 are enlarged to provide stops for the valve elements to hold them at a predetermined distance from the surface of the camming lug 302 of the reaction plate when the reaction plate is in a clutch released position. On counterclockwise input to the reaction plate, relative to the backing plate, the cam surface 306 engages the projecting contact end of the valve 310 to effect its inward displacement in response to a torque reversal from the phantom line to the full line position thereto.

Assuming, for example, the transmission is in third gear range and is automatically shifting to second gear, the line torque reversal causes the reaction plate to turn so that the ball 300 climbs the ramp provided by the interfacing conical cavities 320, 302 effecting the limited helical motion of the reaction plate to the position from 7a to 7b, for example. When this occurs, the port b in backing plate 284 is cracked and the pressure fed through line 324 to the apply chamber 314 in the multi-mode clutch is regulated to match the torque requirements of the friction drive establishing device. After second range is obtained, the multi-mode clutch can be locked as described in connection with the first embodiment of this invention.

On 5-4 downshifts 5-4 torque is reversed as compared to the 3-2 downshift and pressure is delivered to the apply chamber 314 through port b and port a and its controlling valve element 308 would provide pressure regulation therein.

When the pressure is relieved from the chambers 314 and 321, the return spring 326 effects the release of the multi-mode friction plates 287 and 288. The camming balls 300 drop to an inactive position in which the multi-mode clutch freewheels in the manner of a one-way sprag or roller friction device.

It will be appreciated that the foregoing disclosure relates to preferred embodiment of the invention and is intended to illustrate the invention for purposes of disclosure of the principles thereof, and not to disclose all possible changes and modifications, which may now be apparent to those skilled in the art. Accordingly, the scope of this invention is set forth in the appended claims.

I claim:

1. A multi-mode fraction drive establishing device for an automatic change speed transmission having input and output drive shaft means and change speed planetary gear set means controlled by selectively engagable friction means to control gear ratio changes of said gear set means, comprising a housing for the multi-mode friction drive establishing device extending around a longitudinal axis of the transmission, said housing having an interior cavity therein defined by an inner radial wall generally transverse to said axis and a generally cylindrical wall extending outwardly of from upper extent of said radial wall and spaced outwardly from said axis, reaction plate means having an exterior wall generally corresponding to the inner radial wall of said housing operatively mounted for limited rotational and axial sliding movement within said housing, said inner radial wall of said housing and said exterior wall of said reaction plate having interfacing cavities which define retainer pockets having bottom portions and ramp means inclined outwardly from said bottom portions, camming means in each of said pockets adapted to be moved from said bottom portions to an infinite number of positions on said ramp means to thereby displace said reaction plate in an axial direction when said reaction plate means is turned relative to said housing, piston means operatively mounted within said reaction plate means and cooperating therewith to define a pressure chamber therein, pressure fluid conducting means for supplying pressure fluid to and from said pressure chamber, support means for connection to the planetary gear set means of the transmission, first and second friction means respectively and operatively connected to said housing and to said support means, said first and second friction means being selectively engagable by said piston means to effect the limited turning and the axial movement of said reaction plate means toward said first and second friction means, port means associated with said pressure fluid conducting means opening into said chamber for feeding pressure fluid into said chamber and additional port means associated with said chamber whose degree of opening is controlled by said reaction plate means for controlling the exhaust of pressure fluid from said chamber to thereby regulate the pressure therein so that the torque capacity of said friction plate means is sufficient to carry torque loads applied thereto for establishing one gear ratio of said transmission, said friction plate means being automatically released during a shift transition of said transmission from said one gear ratio to another gear ratio as torque load is removed from said reaction plate means.

2. Improvement for an automatic change speed transmission having input and output drive shaft means adapted to be operatively interconnected by change speed gear set means controlled by selectively engaged friction means and associated hydraulic controls to effect gear ratio changes of said gear set means, the improvement comprising a bi-directional multi-mode friction drive establishing device having discrete fully released, fully locked and having one-way modes of operation selectively effective in either direction of torque directed thereto, said bi-directional multi-mode friction drive establishing device including a housing extending about a longitudinal axis of the transmission and having an interior cavity therein defined by a first wall portion generally transverse to said axis and an outer wall portion projecting from said first wall portion, reaction plate means operatively mounted for limited turning movement in opposite directions from a fully released mode position within said housing and cooperating therewith to define a first hydraulic pressure chamber adapted to be operatively connected to receive pressure fluid from and exhaust pressure to said hydraulic controls, cam means associated with said first wall portion of said housing and a wall of said reaction plate means for displacing said reaction plate means within said housing when turned in either direction from said released mode position, piston means operatively mounted within said reaction plate means and cooperating therewith to define a second hydraulic pressure chamber therein adapted to be connected to receive pressure fluid from and exhaust pressure fluid to said hydraulic controls, said bi-directional multi-mode friction drive establishing device including friction means selectively engaged by said piston means by the pressure charging of said first and second chambers of said multi-mode clutch with sufficient pressure fluid from said hydraulic controls to condition said multi-mode friction drive establishing device for a lock mode of operation to thereby condition the transmission in a predetermined speed gear ration, said multi-mode friction drive establishing device being subsequently conditioned for a one-way mode of operation by the supply of a sufficient fluid pressure to said second chamber and the exhaust of fluid pressure from said first chamber for effecting the automatic synchronized shift to another gear ratio and said multi-mode friction drive establishing device being further conditioned for a release mode of operation for the conditioning of the transmission to said another gear ratio.

3. The improvement defined in claim 2 wherein said housing has first and second spaced fluid switching ports therein for selectively supplying and exhausting fluid with respect to said second chamber, said controls including flow restriction means therein to feed fluid pressure to said second chamber, said reaction plate having port control means for said first and second ports operative in one bi-directional mode for restricting a first of said ports for controlling the rate of exhaust of pressure fluid from said second chamber while the second of said ports is feeding pressure fluid to said second chamber from said restriction means of said controls sufficient to effect the one-way operation in a first directional mode of operation of said bi-directional multi-mode friction drive establishing device in response to of torque turning said reaction plate in a first direction relative to said housing and operative in a second directional mode of operation of said bi-directional multi-mode friction drive establishing device for restricting a second of said ports for controlling the rate of exhaust of pressure fluid from said second chamber while the first of said ports is feeding fluid pressure to said second chamber from said restriction means of said controls to effect the one way operation of said multi-mode friction drive establishing device in response to torque turning said reaction plate in a direction opposite to said first direction relative to said housing for effecting synchronized shifting of gear ratios.

4. The improvement defined in claim 3 wherein reaction plate has a collar and said housing has an inner hub on which said collar is mounted for relative rotation, said port control means being formed by generally v shaped notches in said collar of said reaction plate which selectively restricts one of said ports as said reaction plate and its collar turns and moves axially on the inner hub of said housing having said spaced ports therein.

5. The improvement defined in claim 3 wherein said ports are in a plate secured to the housing of the transmission and have control valve members operatively mounted therein, said reaction plate having camming surfaces operatively mounted thereon for contacting said valve members and to thereby control the cracking of said ports in response to the direction and degree of rotation of said reaction plate relative to its housing to thereby control and regulate the pressure in said second chamber and the torque capacity of said bi-directional multi-mode friction drive establishing device.

6. A bi-directional multi-mode friction drive clutch conditionable for one-way locking action in response to torque reversals comprising in combination a housing, a reaction plate mounted for turning and longitudinal movement within said housing from an initial clutch release position to a clutch apply position, a backing plate fixed to said housing, a plurality of friction plates splined to an extending portion of said reaction plate, a plurality of friction plates operatively interleaved with said first friction plates, a support for the interior of said second friction plates operatively connected to said transmission gearing, a hydraulically actuated piston for effecting the physical release and operative frictional engagement of said first and second friction plates and said backing plate, said piston means being mounted in said piston reaction plate to define a fluid pressure chamber therein, first and second fluid port means spaced from one another extending in said housing and leading into said chamber and control means for connecting a first of said ports to a supply of fluid pressure and the other of said ports to an exhaust to effect, one-way locking action when said reaction plate is turned in one direction relative to said housing, and for connecting the first of said ports to an exhaust and the second of said ports to said supply of fluid pressure to effect one-way locking action when said reaction plate is turned in an opposite direction relative to said housing, and cam means operatively disposed between said reaction plate and said housing for effecting axial motion of said reaction plate when turned in either direction relative to said housing in response to the reversals of torque directed to said housing, said camming means being operative to effect the automatic release of said friction plate means when the direction of torque is reversed during upshifting of said transmission.

7. A multi-mode clutch for changing gear ratios in an automatic transmission having a central axis and gearing controllable to provide a plurality of different gear ratios, the improvement comprising a shell-like housing extending around the central axis, a reaction plate mounted for limited turning and axial movement in said housing and cooperating therewith to form a first fluid pressure chamber, of said multi-mode clutch, a piston operatively mounted for limited stroking movement within said reaction plate to define a second fluid pressure chamber of said multi-mode clutch, first annular friction plate means having outer diameters operatively connected to said reaction plate, second friction plate means interleaved with said first annular friction plate means having inner diameters, torque transmitting support means operatively connected to said inner diameters of said second plate means, said first and second friction plate means defining a friction clutch pack, a backing plate associated with said clutch pack connected to said housing, first and second switch means defined by discrete port means for feeding and discharging pressure fluid from said second chamber to control the build up fluid pressure in said chamber so that said piston means can direct an apply force resulting in the frictional engagement of said first and second friction plate means for establishing a gear ratio in the transmission, spring means associated with said piston means for moving said piston means from engagement with said first and second friction means in response to the exhaust of fluid pressure in said second chamber sufficient to eliminate the apply force of said pressure, and cam means operatively disposed in said first chamber and between said housing and said reaction plate for turning said reaction plate in response to torque loading of said first and second plate means to thereby control the amount of opening of either of said port means when serving to exhaust pressure fluid from said chamber to control the pressure in said second chamber and the apply force directed by said piston to said first and second friction plate means.

* * * * *